United States Patent [19]

Sizonenko et al.

[11] Patent Number: 5,004,050
[45] Date of Patent: Apr. 2, 1991

[54] METHOD FOR WELL STIMULATION IN THE PROCESS OF OIL PRODUCTION AND DEVICE FOR CARRYING SAME INTO EFFECT

[76] Inventors: Olga N. Sizonenko, ulitsa Inzhenernaya, 13, kv. 2, Nikolaev; Rafkhat A. Maxutov, Leninsky prospekt, 67, kv. 164, Moscow; Pavel P. Maljushevsky, Oktyabrsky prospekt, 33, kv. 41; Georgy G. Gorovenko, ulitsa Skorokhodova, 54, kv. 20, both of Nikolaev; Alexei V. Sokolov, prospekt Mira, 112, kv. 255, Moscow; Diana N. Lyapis, ulitsa Naberezhnaya, 5, kv. 20, Nikolaev; Vladimir I. Schekin, prospekt Lenina, 10a, kv. 97, Nikolaev; Natalya I. Kuskova, Oktyabrsky prospekt, 5, kv. 27, Nikolaev, all of U.S.S.R.

[21] Appl. No.: 457,828

[22] Filed: Jan. 12, 1990

[51] Int. Cl.$^5$ .......................................... E21B 43/24
[52] U.S. Cl. ..................................... 166/248; 166/249; 166/65.1
[58] Field of Search ................. 166/248, 249, 65.1, 166/177; 175/16; 299/14; 134/1; 366/120

[56] References Cited

U.S. PATENT DOCUMENTS

| 3,420,300 | 1/1969 | Todd . | |
|---|---|---|---|
| 3,503,446 | 3/1970 | Brandon | 166/249 |
| 3,946,809 | 3/1976 | Hagedorn | 166/248 |
| 4,067,390 | 1/1978 | Camacho et al. | 166/302 |
| 4,074,758 | 2/1978 | Scott | 166/249 |
| 4,164,978 | 8/1979 | Scott | 166/249 |
| 4,169,503 | 10/1979 | Scott | 166/65.1 |
| 4,343,356 | 8/1982 | Riggs et al. | 166/60 |
| 4,345,650 | 8/1982 | Wesley | 166/249 |
| 4,479,680 | 10/1984 | Wesley et al. | 299/14 |
| 4,667,738 | 5/1987 | Codina | 166/248 |

FOREIGN PATENT DOCUMENTS 2574559 12/1984 France .
2199660 7/1988 United Kingdom .

Primary Examiner—William P. Neuder
Attorney, Agent, or Firm—Burgess, Ryan & Wayne

[57] ABSTRACT

The method consists in generating periodically shock waves by initiating the electric discharge in a fluid filling in the well between the electrodes. To initiate the electric discharge, a current-conducting fluid comprising a dielectric fluid and a current-conducting powder material is fed additionally between the electrodes. The device for carrying the method into effect comprises a discharge chamber (5) with positive and negative a system of feeding an initials between the electrodes (3, 4), a system of feeding an initiator between the electrodes (3, 4), electrodes (3, 4), and a surge current generator (2). The device has at least one metering valve (12) with a drive (13) and an additional chamber (9) filled in with a dielectric fluid. A duct (10) having a pressure spool valve (11) is provided in the wall of the additional chamber (9). Inlet and outlet holes (7, 6) are provided in the wall of the discharge chamber (5).

22 Claims, 2 Drawing Sheets

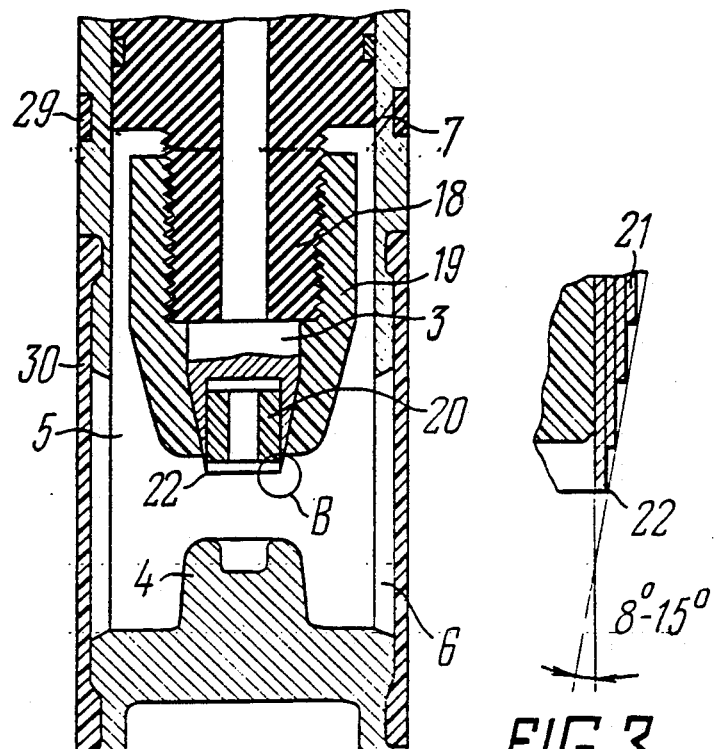
FIG.2
FIG.3
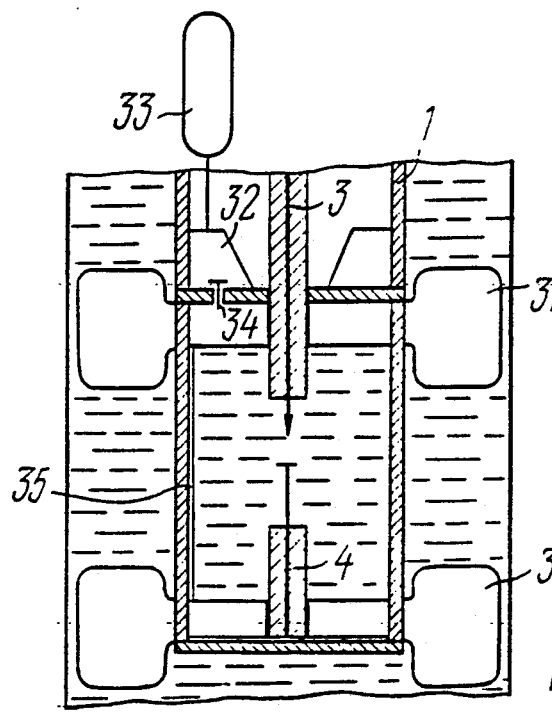
FIG.5

METHOD FOR WELL STIMULATION IN THE PROCESS OF OIL PRODUCTION AND DEVICE FOR CARRYING SAME INTO EFFECT

FIELD OF THE ART

The invention relates to methods and means for well stimulation in production of oil, water, gas or soluble substances from wells, and more particularly it relates to methods for well stimulation in the process of oil production and devices for carrying same into effect.

PRIOR ART

There are known at present technical solutions aimed at stimulating wells using conversion of electric energy into other kinds of energy which acts on the well and hole-bottom region to remove accumulations of asphalt- and resinous substances from filtration channels in the development of hydrocarbon deposits and any mechanical impurities in said other case. Should an electric energy source have a higher power, new filtration channels are likely to be formed and the existing ones are likely to be expanded.

There is known a method for well stimulation in the process of oil production and a device for carrying same into effect (U.S. Pat. No. 4,345,650), wherein electric energy stored in a capacitor is converted into mechanical energy of shock waves propagating through the producing formation by releasing the electric energy into a spark discharge channel between electrodes arranged at the oil-bearing bed level, high voltage being fed to the electrodes from the capacitor charged by the charger, viz. the surge current generator which is connected by means a logging cable with a power source on the surface. In this case the electric spark is initiated by increasing intensity of the electric field across the electrodes in the prebreakdown period and the shock wave is channeled into the bed.

The aforesaid method envisages initiation of an electric spark in the device through an increase in the field intensity. The method provides for pulling out of a tubing string and sucker rods and filling-up of the well with a killing fluid. Since the well killing fluid is an emulsive solution or acid or mineralized water of high electrical conduction $\sigma = 10^{-10 ohm^{-1} m^{-1}}$, all being highly conducting media, it is, therefore, impossible to bring about breakdown even though we step up the charging voltage of the high-voltage capacitor and decrease the discharge gap. In this case there occurs exponential flowdown of the capacitor's electric charge without forming a current-conducting channel closing the electrodes. The shock wave is not generated, the producing formation being acted upon solely through heavy conduction currents which reach the same high values as in the case of breakdown.

The device for carrying into effect the method for well stimulation in the process of oil production comprises a discharge chamber with positive and negative electrodes connected with a surge current generator which transfers a high-voltage charge of capacitors of the initiation system connected in series and main parallel-connected capacitors to the discharge gap to form a discharge channel. The field intensity increases upon stepping up of the charging voltage of the series-connected capacitors of the initiation system increasing the voltage of the main parallel-connected capacitors with low charging voltage.

However, with the voltage being fed to the electrodes from the surge current generator, no breakdown takes place, but there occurs exponential flowdown of the capacitor's electric charge without forming a discharge channel closing the electrodes. In such capacitors it is impossible to step up the charging voltage owing to the limited thickness of partition insulators because of the radial dimension of a well. The bed is not stimulated since no shock wave is generated in this case.

Among the disadvantages of the method and the device are also low efficiency and unstable operation of the device in aqueous solutions of any electrical conduction and pure light hydrocarbons in situations where the formation pressure exceeds 20 MPa. The fact is that discharge initiation intensity increases under these conditions exceeding 100 kV/cm, which calls on the one hand for an increase in the charging voltage of the capacitors of the initiation system above the values due to the permissible thickness of the partition insulators (hundreds of kilovolts) restricted by the well's radial dimension, which in turn renders the capacitors inoperative and hence affects efficiency and reliability of both the method and the device. On the other hand, higher intensity can be achieved through reducing the discharge gap; this, however, will result in a mismatch of the surge current generator and the spark discharge channel load. Consequently, energy losses in the generator will increase, the character of energy release into the discharge channel will no longer be optimum, and the intensity of the shock wave stimulating the bed will decrease.

There is further known a method for well stimulation in the process of oil production and a device for carrying same into effect (U.S. Pat. No. 4,343,356) involving stimulation of a well in the process of oil and/or gas and/or gas-condensate production. The method consists in generating periodically shock waves propagating through the producing formation by releasing electric energy in a discharge channel between a pair of electrodes which are fed high voltage with induced discharge initiation in a fluid filling in the well. The induced initiation is accomplished by introducing an exploding metal conductor into the discharge gap. The conductor is fed automatically following each discharge and placed in the discharge gap.

However, the method features high energy losses (15-50 percent of stored energy) at the stage of conductor heating, melting and evaporation and high optical radiation losses, which drastically decreases shock wave intensity.

Besides, the method makes it possible to generate shock waves whose intensity is largely restricted due to the fairly low amount of energy stored in the high-voltage capacitor. The greater store of electric energy involves increased dimensions of insulation, which is impermissible under the conditions of the well's restricted radial dimension. Because of the small dimensions of wells whose diameter is generally less than 150 mm (it is still less—114-120 mm—when developing reservoirs occurring at a depth of 3 to 5 km) and since the operating voltage should exceed 20-25 kV, it is practically impossible to develop reservoir capacitors of adequate power and reliability. This problem is further aggravated by the fact that the borehole temperature generally exceeds from 70° to 100° in the producing formation interval.

The device for carrying into effect the method for well stimulation in the process of oil production comprises a discharge chamber with positive and negative electrodes, a system of feeding an initiator between the electrodes and surge curent generator connected with the electrodes. The initiator feed system is a device for mechanized introduction of the conductor via the positive electrode to the negative one.

However, such a device for mechanized introduction of the conductors lacks reliability due to surface rupture or sticking-on of the conductors at points where they come into contact with the current-conducting parts. The material of the current-conducting parts undergoes high absolute carry-away due to spark erosion.

DISCLOSURE OF THE INVENTION

The invention is aimed at the provision of a method for well stimulation in the process of oil production and a device for carrying same into effect which make it possible to increase intensity of the shock wave stimulating the producing formation by changing the electric discharge initiation conditions.

The aforesaid object is attained due to the fact that in a method for well stimulation in the process of oil and- /or gas-condensate production consisting in periodically generating shock waves propagating through the producing formation by initiating the electric discharge in a fluid filling in the well between the electrodes positioned in the well, according to the invention, a current-conducting fluid comprising a dielectric fluid and a current-conducting powder material is fed additionally to initiate the electric discharge between the electrodes.

It is expedient that hydrocarbon or silicon liquid or water be used as a dielectric fluid.

It is preferred that metal or graphite be used as a current-conducting powder material.

It is also preferred that aluminum or magnesium powder be used as a current-conducting powder material.

It is desirable that an oxidizer responsible for the exothermic reaction be fed between the electrodes concurrently with a current-conducting fluid.

It is reasonable in some instances that the oxidizer be fed following the formulation of the electric discharge.

It is preferred that lead dioxide or ferric oxide or potassium permanganate to be used as an oxidizer.

It is preferred in some instances for a gaseous oxidizer interacting with products formed during the electric discharge to be used.

In this case it is reasonable that some oxygen-containing gas be used as an oxidizer.

It is likewise reasonable that the temperature of a fluid filling in the well be measured at regular intervals in the process of oil production. Should the temperature be found lower than the oil coking point, the amount of the oxidizer fed is to be increased and should it be found higher than the oil coking point, the amount of the oxidizer fed is to be accordingly decreased.

The proposed method and electric discharge initiation conditions described herein above ensure that the intensity of the shock wave stimulating the bed is increased.

The aforesaid object is also accomplished due to the fact that the device for carrying the method into effect, comprising at least one discharge chamber with positive and negative electrodes, a system of feeding an initiator between the electrodes and a surge current generator connected with the electrodes, according to the invention, has at least one metering valve with a drive connected with the surge current generator to ensure synchronous operation of the metering valve in the event of the electric discharge between the electrodes, and an additional chamber filled in with a dielectric fluid, the metering valve periodically bringing the discharge chamber in communication with the additional chamber by means of a duct provided in the wall of the additional chamber and in the negative electrode and having a pressure spool valve to ensure a constant differential pressure in the additional chamber and that in the well, the wall of the discharge chamber being provided with inlet and outlet holes to communicate with the borehole medium.

It is preferred that with the duct provided in the additional chamber and in the negative electrode, the positive electrode be made tubular in form from some erosion-resistant material whose hollow interior is filled in with a solid dielectric matter.

It is preferred that the positive electrode be composed of a plurality of tubular elements arranged coaxially with one another so that the outer surface of one tubular element adjoins the inner surface of another tubular element and each of the outer tubular elements is displaced relative to the adjacent inner tubular element away from the negative electrode. It is reasonable that the tubular elements be displaced with respect to one another at a uniform spacing so that the taper surface encompassing the edges of the tubular elements makes up an acute angle of from 8° to 15° with the longitudinal axis of the positive electrode.

It is expedient that in order to stimulate the well filled in with formation water or drilling fluid, the system of feeding an initiator from the negative electrode to the positive one comprise a hydraulic amplifier amnd a pneumatic hydraulic accumulator connected by means of a duct with the pressure spool valve and the metering valve and arranged in the following sequence; the hydraulic amplifier, the pressure spool valve, the pneumatic hdyraulic accumulator, and the metering valve, the additional chamber forming the upper part of the hydraulic amplifier and being filled in with a current-conducting initiating fluid and the lower part of the hydraulic amplifier communicating with the borehole medium.

Advantageously, the inlet and outlet holes in the wall of the discharge chamber are covered on the outside with elastic diaphragms.

It is expedient that gas-filled elastic envelopes provided on the both sides of the outlet hole in the discharge chamber and insulating the space between the bore-hole wall and that of the discharge chamber be used on the outside.

With at least one metering valve with a drive connected with the surge current generator, it is possible to bring discharge time and that of feeding an oxidizer into perfect synchronism.

Provision of the additional chamber in the device makes it possible to store a dielectric fluid therein.

With the discharge chamber periodically communicating with the additional chamber by means of the metering valve, it is possible to meter out the amount of a dielectric fluid - an oxidizer to ensure its full interaction with hydrogen and acetylene.

In order for the exothermic reaction to proceed, a dielectric fluid is fed into the discharge chamber via the duct provided in the wall of the additional chamber.

The duct has the pressure spool valve to ensure that the constant excess pressure is maintained in the duct relative to the well, thus enabling the constant volume of a fluid to be fed as the pressure in the additional chamber changes to obtain stable operation of the device.

The outlet hole in the wall of the discharge chamber serves to eject a jet formed during discharge onto the borehole wall for bed stimulation and the gas-vapour space formed in this case in the discharge chamber is filled with a fluid out of the well via the inlet hole.

The use of the positive electrode tubular in form made from some erosion-resistant material makes it possible to increase electrode life up to $5 \cdot 10^3$ pulses, while ensuring a fairly high level of fluid intensity in the electrode-to-electrode gap, whereas with a dielectric filling in the electrode hollow interior, it is possible to decrease prebreakdown losses.

The embodiment of the positive electrode as a plurality of tubular elements makes it possible to initiate the dishcarge upon destruction of a layer of the tubular element forming a sharp edge from the edge of the subsequent layers. The angle defined by the taper surface encompassing the edges of the fubular elements and the longitudinal axis of the positive electrode is from 8° to 15°. The minimum value of the angle is limited by the strength of the electrode's effective portion; should the angle be less than 8°, the edge breaks giving rise to great deformations and should it exceed 15°, the discharge efficiency decreases.

The system of feeding an initiating fluid provided in the device for well stimulation is adapted for stimulating the well filled in with formation water or drilling fluid. The system of feeding a fluid from the negative electrode to the positive one ensures stable initiation through feeding a current-conducting fluid under the predetermined excess pressure (relative to external alternating pressure), while makes it possible to maintain the constant form of the initiating jet fed into the electrode-to-electrode gap and hence the amplitude of the shock wave stimulating the bed. Incorporation of the hydraulic amplifier into the initiator feed system, makes it possible to produce excess pressure in the additional chamber filled in with a current-conducting fluid by using external well pressure, no additional power sources being required.

The pressure spool valve provided in the initiator feed system ensures that the constant excess pressure is maintained in the duct relative to the well, thereby enabling the constant volume of a current-conducting fluid to be fed. With the use of the pneumatic hydraulic accumulator, it is possible to stabilize pressure in the duct as a current-conducting fluid flows into the discharge chamber. The presence of the metering valve a drive connected with the surge current generator ensures that a fixed fluid volume is fed synthronously into the discharge chamber. Since use is made of the elastic diaphragms adapted to cover the inlet and outlet holes on the outside, it is possible to provide a space filled in with a dielectric fluid and insulated from the well and at the same time to release gases formed therin during electric discharges, which ensures stable operation of the device in wells filled in with high-conductivity solutions. The elastic diaphragm allows for an effective transfer of shock wave and fluid flow pressure to the surroundings for bed stimulation.

With the gas-filled elastic envelopes arranged on both sides of the outlet hole in the discharge chamber, it is possible to provide an insulated space between the borehole wall and that of the discharge chamber filled in with a well fluid. A shock wave propagates in this insulated space. In this case its intensity greatly increases since upon reaching the gas-filled elastic envelope, the wave is reflected as a rearefaction wave beyond the front of which the pressure will vanish practically at once and within a period of time ranging from (0 to 70 µs the volume cavitation affects the fluid across its whole width. Higher shock wave intensity is accomplished through the collapse of cavitation bubbles within the limits of the pressure wave with an amplitude of up to $1 \cdot 10^5$ MPa and cumulative fluid jets stimulating the bed.

Thus, the proposed method for well stimulation and the device for carrying same into effect make it possible to accomplish the aforesaid object since they offer the following advantages by changing the electric discharge initiation conditions and design features of the device;

higher intensity of the shock wave stimulating the bed;

stable operation of the device in wells filled in with current-conduction solutions;

stable operation of the device under the conditions of alternating external pressure.

SUMMARY OF THE DRAWINGS

Given below is a description of an exemplary embodiment of the present invention with due reference to the accompanying drawings, wherein:

FIG. 2 is a scaled-up representation of unit A in FIG. 1;

FIG. 3 is a scaled-up representation of unit B in FIG. 2;

FIG. 5 is a view of the device of FIG. 1, wherein gas-filled elastic envelopes are provided on the outside.

PREFERRED EMBODIMENT OF THE INVENTION

Figure 1:
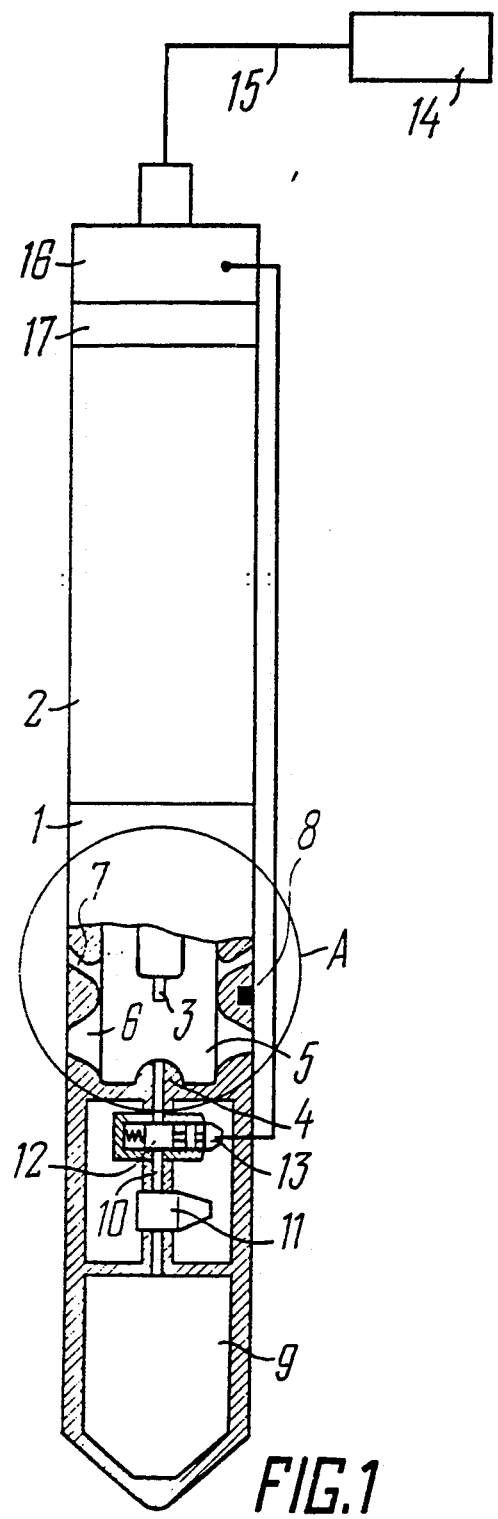
FIG. 1 is a schematic longitudinal section view of a device for well stimulation, according to the invention.

The method for well stimulation in the process of oil and/or gas and/or gas-condensate production resides in the fact that shock waves are periodically generated to propagate through the producing formation. The shock waves are generated by initiating an electric discharge in a fluid filling in the well between the electrodes positioned in the well. For initiating the electric discharge, a current-conducting fluid is fed additionally between the electrodes, as a result of which a shock wave with a steep front is formed. The current-conducting fluid comprises a dielectric fluid and a current-conducting powder material.

With the electric discharge in the fluid filling in the well initiated by the current-conducting fluid fed, a shock wave with a steep front is formed, which is typical of the electrical discharge, the pulse duration being determined by the amount of the current-conducting fluid.

The current-conducting fluid is based on some dielectric fluid, say, hydrocarbon, silicon or water.

Since the initiator is fired in the discharge channel, combustion proceeds at a high initial pressure and temperature. As this takes place, there occurs no closing of rock fissures and channels formed during discharge initiation, the more so because the heated fluid flows into the bed at a high speed. After feeding the voltage following the closure of the electrode-to-electrode gap of the current-conducting fluid, the discharge first develops along the interface between the current-conducting fluid and the well fluid. This process is an electronic breakdown in nature, i.e. prebreakdown enerby loss is negligible. The breakdown gives rise to the current-conducting plasma channel, wherein the matter (current-conducing fluid) is heated up to the temperature of $3 \cdot 10^4 K$ with pressure reaching $2 \cdot 10^3$ MPa. As electric power increases, the plasma channel widens. & The oxidizer is first fed at the end of the first half-cycle of energy release in the electric discharge channel when more than 80 percent of energy stored in the capacitors is released. During this period of time the load resistance substantially varies and the shock wave front is formed. Since the energy stored by the capacitore enters the electric discharge channel within a period of $(60-80) \cdot 10^{-6}s$ and the first half-cycle is approximately $(20-25) \cdot 10^{-6}s$, the oxidizer is fed practically at a moment the energy release is completed with the discharge channel already widened.

To increase the well fluid temperature, the oxidizer is fed concurrently with the current-conducting fluid.

The current-conducting powder material and the oxidizer positioned in the electrode-to-electrode gap are heated up to the mixture ignition temperature and undergo exothermic reaction. By this time a near-front portion of the shock wave is formed. The shock wave area covers the space between the wave front and the discharge channel filled in with a radially divergent flow of the compressed fluid. Thus, the power transmitted by the shock wave and expended on changing the inner state of the well fluid setting it in motion is a combination of power released in the discharge channel and the one released as a result of the exothermic reaction.

The shock wave acts on the rock causing it to disintegrate, the well fluid having higher temperature entering the hole-bottom region of the hole section involved and heating it. All the subsequent breakdowns of the electrode-to-electrode gap occur in the same sequence until the well fluid temperature at the bottom hole reaches the oil coking point. To prevent a decrease in permeability of the hole-bottom region due to oil coking, the oxidizer feed is cut off, the bed being stimulated solely by the shock waves resulting from electric discharge. With a lower temperature, the oxidizer is fed again, thereby causing the well fluid temperature to increase.

The current-conducting fluid may comprise a mixture of, say, oil refining fractions and a powder of, say, aluminum, carbon or magnesium. For the oxidizer, use can be made of metal oxides, say, lead dioxide, iron ore or potassium permanganate.

The process of the invention is characterized by a constant rate of supplying of thermal energy into the electrode-to-electrode gap. In this case the borehole temperature in the section involved is determined by the amount of introduced heat and by the rate of heat removal into the bed and along the borehole with the heated well fluid in motion.

With the current-conducting fluid and the oxidizer introduced separately, it is possible to initiate the discharge by means of the current-conducting fluid with constant electrical parameters, which ensures stable bed stimulation and treatment under preset conditions. The amount of the oxidizer is adjusted in accordance with the well fluid temperature which should not higher than the predetermined oil coking point.

To prevent a decrease in permeability of the hole-bottom region, the oil coking point is determined, the well fluid temperature is periodically measured at the involded section level and the amount of the oxidizer fed into the current-conducting fluid is reduced with the well fluid temperature increasing to reach the oil coking point. In this case the oxidizer feed temperature is increased with the fluid temperature going down below the oil coking point.

The variation in the amount of the oxidizer in the current-conducting fluid is intended first and foremost for varying the amount of heat liberated during each particular discharge.

In the event of the electric discharge in the well filled in, say, with hydrocarbon liquid, there occur high temperatures in the discharge channel (up to $10^4 K$) causing hydrocarbons to decompose forming up to 50 percent hydrogen and up to 25 and 30 percent acetylene. In this case it is expedient to feed some gas-forming oxidizer, say, oxygen in amounts to ensure its full interaction with hydrogen and acetylene. As a result of exothermic reactions, additional energy is released and the temperature of the moving fluid can reach several thousand degrees, thereby giving rise to rock fissures and bed heating and hence causing oil to migrate to the bottom hole. Carbon dioxide yielded as a result of acetylene reacting with the oxidizer-oxygen favours in turn oil displacement. The adsorption of carbon dioxide by oil increases a store of energy it possesses and decreases fluid viscosity. Besides, carbon dioxide, while reacting with the mineral portion of the oil and/or gas and/or gas-condensate reservoir, dissolves certain components of the rock skeleton, thus adding to its permeability. The second and subsequent breakdowns in the gap occur in the same sequence. In doing so, the bottom-hole temperature is checked to be maximum permissible. As noted above, the point of high-molecular hydrocarbon fractions coking is considered to be such a temperature.

Thus, the proposed method ensures higher intensity fo the shock wave stimulating the bed.

The device comprises a housing I (FIG. 1), whose upper portion accommodates a surge current generator 2 electrically connected with a positive electrode 3 and a negative electrode 4 provided in a discharge chamber 5. Provided in the wall of the discharge chamber 5 is an inlet hole 6 for ejecting a fluid jet formed during discharge and an inlet hole 7 for filling it in with a well fluid. The discharge chamber 5 is provided with a temperature sensor 8 to check the bottom-hole temperature. Positioned below the discharge chamber 5 is an additional chamber 9 communicating with the discharge chamber 5 by means of a duct duct 10 via the negative electrode 4. The device also comprises a system of feeding an initiator between the electrodes 3, 4 which is a pressure spool valve 11 and a metering valve 12. The pressure spool valve 11 ensures that the constant excess pressure is maintained in the duct 10 relative to the well and the metering valve 12 adjusts the amount of the dielectric fluid and is connected with a drive 13. The device is connected to a control panel 14 positioned at the wellhead via a wire cable 15. The control panel 14 serves to switch on the surge current generator 2 via a surge current generator control unit 16 whose output is connected with the input of a temperature sensor unit 17.

With the duct 10 provided in the additional chamber 9 and the negative electrode 4, the positive electrode 3

(FIG. 2) is made tubular in form from some erosion-resistant material whose hollow interior is filled in with a solid dielectric matter. The electrode 3 is accommodated in an insulator 18 and has external and internal insulating bushes 19, 20.

The positive electrode 3 is made of a plurality of tubular elements 21 arranged coaxially with one another, so that the outer surface of one tubular element 21 adjoins the inner surface of another tubular element 21 and each of the outer tubular element 21 is displaced relative to the adjacent inner tubular element 21 away from the negative element 4. The electrode 3 has a sharp edge 22.

The tubular elements 21 are displaced with respect to one another at a uniform spacing, so that the taper surface encompassing the edges of the tubular elements 21 makes an acute angle of from 8° to 15° with the longitudinal axis of the positive electrode, the angle corresponding to the bevel angle of the sharp edge 22. Should it be less than 8°, the edge 22 breaks giving rise to great deformations and should it 15°, the discharge efficiency decreases. Such a constructional arrangement of the positive electrode 3 in conjunction with the duct 10 in the negative electrode 4 ensures higher intensity of the shock wave stimulating the producing formation through the reduction of prebreakdown losses and discharge delay time.

Figure 4:
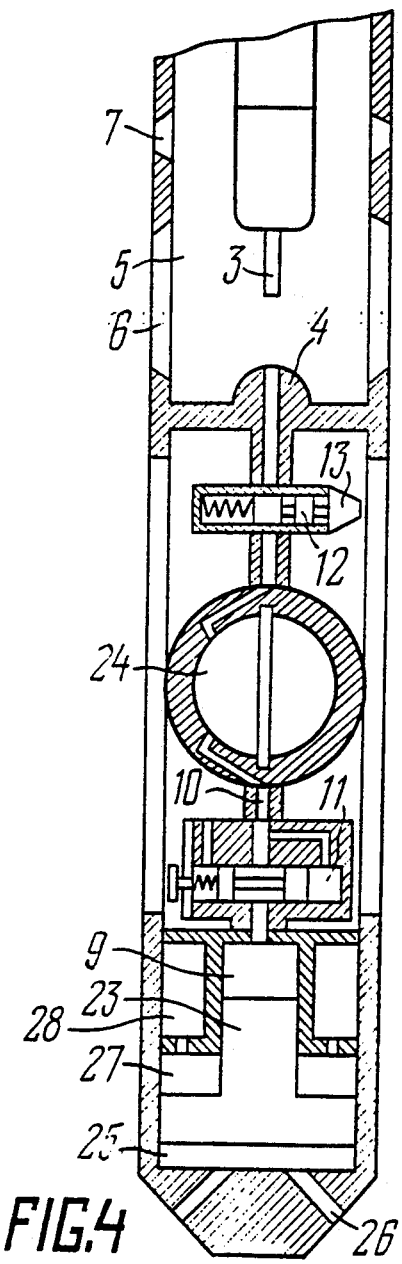
FIG. 4 is a view of the device of FIG. 1, wherein the initiator feed system comprises a hydraulic amplifier and a pneumatic hydraulic accumulator.

To stimulate wells filled in with formation water or drilling fluid, the system of feeding a current-conducting initiating fluid (FIG. 4) from the negative electrode 4 to the positive electrode 3 comprises a hydraulic amplifier 23 and a pneumatic hydraulic accumulator 24 which are connected by means of the duct 10 with the pressure spool valve 11 and the metering valve 12 and arranged in the following sequence: the hydraulic amplifier 23, the pressure spool valve 11, the pneumatic hydraulic accumulator 24, and the metering valve 12. The additional chamber 9 forms the upper part of the hydraulic amplifier and is filled in with a current-conducting initiating fluid. A lower part 25 of the hydraulic amplifier 23 is communicated with the borehole medium via an opening 26 and a rod end 27 of the hydraulic amplifier 23 is filled with gas and communicates with a reservoir 28. The hydraulic amplifier 23 is connected via the pressure spool valve 11 with the pneumatic hydraulic accumulator 24 which is in turn connected with the metering valve 12 operated from the drive 13 powered by the surge current generator 2.

To ensure stable operation of the device in wells filled in with high-conductivity solutions (FIG. 2), the inlet and outlet holes 7, 6 in the wall of the discharge chamber 5 are covered on the outside with elastic diaphragms 29, 30.

The device has gas-filled elastic envelopes 31 (FIG. 5) provided on the outside on the both sides of the outlet hole 6 (FIG. 1) of the discharge chamber 5 and fitted with a pressurization system 32 (FIG. 5) to maintain backpressure when running the device down and a pressure relief system 33 operated when pulling it up. Emerging from the pressurization system 32 gas enters the envelopes 31 via a valve 34 through a pipe 35. This ensures insulation of the space between the borehole wall and that of the chamber filled in with a well fluid, wherein the shock wave intensity greatly increases due to volume cavitation.

The device for well stimulation operates as follows.

The device is run into the well killed with a hydrocarbon liquid on the wire cable 15 (FIG. 1). The surge current generator control unit 16 is switched on at the control panel 14 to feed power to the electrodes 3, 4 of the discharge chamber 5 and the drive 13. There occurs a high-voltage electric breakdown in the fluid with a plasma discharge channel formed whereinto energy is applied for $(60-80) \cdot 10^{-6}$s. The matter in the discharge channel is heated up to the temperature of $(2-4) \cdot 10^4$ K. and the pressure is built up to $(1-1.5) \cdot 10^3$ MPa. The liquid hydrocarbons break down at such high temperatures yielding mostly hydrogen and acetylene. Under the effect of high pressure the discharge channel widens and is imparted fairly high velocities which are directed along the radii emanating from about the central part of the discharge gap, after which the fluid contained in the chamber is given a rapid motion and ejected as high-velocity jets.

Concurrent with the high-voltage electric breakdown, the drive 13 operates to open the metering valve 12 and the oxidizer flows in required quantities from the additional chamber 9 via the pressure spool valve 11 through the duct 10 into the discharge chamber 5 where it is entrapped in the fluid jet to start a chemical reaction with additional liberation of heat. The heated fluid jet saturated with carbon dioxide penetrates into the bed at a rate of 1500–2000 m/s disintegrating rock and heating the bed. The second and subsequent breakdowns in the gap occur in the same sequence up to the moment the temperature exceeds the oil coking point. At this point the signal is fed from the temperature sensor 8 to the temperature sensor unit 17 which transmits the signal to the surge current generator control unit 16 to switch of the surge current generator 2.

With the positive electrode 3 (FIG. 2) shaped as a plurality of tubular elements 21 (FIG. 3), the device operates in much the same way. With the voltage applied to the electrode 3 (FIG. 2), there occurs a breakdown in the gap between the edge 22 and the negative electrode 4. The provision of the electrode shaped as a plurality of tubular elements 21 (FIG. 3) made from some erosion-resistant material and having the sharp edge 22 causes the electric discharge to be formed by the electrical mechanism with minimum losses, which increases shock wave intensity. Upon destruction of the tubular element 21 defining the sharp edge 22 the discharge is formed from the edge 22 of the subsequent layers of the tubular elements 21 giving rise to their erosional wear. The sharp edge 22 is self-sharpening.

With the system of feeding an initiator (FIG. 4) from the negative electrode 4 to the positive one 3 comprising the hydraulic amplifier 23 and the pneumatic hydraulic accumulator 24, the device operates in much the same way and enables stimulation of wells filled in with formation water or drilling fluid, except that the surrounding medium penetrates via the inlet hole 7 into the discharge chamber 5 and via the openings 26 into the lower part 25 of the hydraulic amplifier 23 affecting the latter. As this takes place, the current-conducting fluid, the additional chamber 9 which forms the upper part of the amplifier 23 is filled with, is brought under pressure exceeding that of the surrounding medium and fills in the pneumatic hydraulic accumulator 24 via the pressure spool valve 11 through the duct 10 until the designated excess pressure (relative to the external alternating pressure) of the current-conducting fluid is reached, after which the pressure spool valve 11 moves to cut off the feed of the current conducting fluid into the duct 10. With the electric signal fed from the surge current generator 2 to the drive 13, the metering valve 12 opens and the current-conducting fluid is fed via the negative electrode 4 to the positive one 3 within a preset period of time $\tau$, thereby forming an initiating bridge between the electrodes. The moment the current-conducting fluid closes the electrode-to-electrode gap, high voltage is fed to the electrode 3 resulting in a breakdown of the initiating bridge. The electric signal is applied with a preset frequency $f = \tau^f$, where $f$ is signal delivery frequency and $\tau$ is time of delivery of each subsequent signal, ensuring a stable high-voltage discharge in the discharge chamber 5. As the current-conducting fluid stored in the duct 10 and the hydraulic chamber of the pneumatic hydraulic accumulator 24 is expended, pressure in the duct 10 decreases and the pressure spool valve 11 opens bringing the pneumatic hydraulic accumulator 24 in communication with the upper part of the amplidier 23, viz. the additional chamber 9.

When the fluid is fed into the duct 10, the amplifier 23 moves to expel gas filling in the rod end 27 to the reservoir 28.

With the device operating in the high-conductivity medium filling in the well, the inlet and outlet holes 7, 6 (FIG. 2) in the wall of the discharge chamber 5 are covered on the outside by the diaphragms 29, 30 respectively and the device operates in much the same way except that prior to running the device into the well the inner space of the discharge chamber 5 is filled in with a dielectric fluid via the inlet hole 7 (with the diaphragm 29 displaced). The air passes through the same hole. Once the discharge chamber 5 is filled in, the diaphragm 29 is replaced. The shock wave formed with the discharge channel widened propagates in the fluid filling in the discharge chamber 5 and passes through the diaphragm 30 out to the surrounding medium. The widening post-discharge gas-vapour space causes the fluid to move in the chamber 5 and beyond its boundaries since the elastic diaphragm 30 does not practically affect the flow hydrodynamics.

To increase intensity of the shock wave stimulating the bed, the device has the gas-filled elastic envelopes 31 (FIG. 5) on the outside and operates in much the same way, except that it is run into the well to a prearranged depth with the pressurization system 32 in operation. In this case gas present under pressure in the space of the pressurization system 32 flows into the elastic envelopes 31 via the valve 34 through the pipe 35. When the envelope 31 is filled the valve 34 closes. The shock wave propagates in the area insulated by the envelope 31.

In what follows the present invention is exemplified by the disclosure of the optimum embodiments thereof.

EXAMPLE 1

Use is made of a device for well stimulation, according to the invention, shown in FIG. 1.

The well is filled with a hydrocarbon liquid. Let us calculate the amount of the oxidizer-oxygen required to interact fully with hydrogen and acetylene.

The mass of hydrocarbon liquid filling in the discharge chamber 5 amounts to 15.4 g. As a result of decomposition following the breakdown in the fluid, the mass of hydrogen will come to 7.7 g and that of acetylene, to 3.8 g.

As a result of the reaction with oxygen $$2C_2H_2 + 5O_2 \rightarrow 4CO_2 + 2H_2O + 600 Kcal$$

$$2M_{C_2H_2} = 2 \cdot 26g = 52g;$$

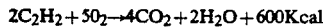

$$5M_{O_2} = 5 \cdot 16g = 80g.$$

The mass of oxygen to ensure full interaction with acetylene is about 6 g.

$$2H_2 + O_2 \rightarrow 2H_2O + 133 Kcal;$$

$$2M_{H_2} = 2 \cdot 2g = 4g;$$

$$5M_{O_2} = 16g \cdot 5 = 80g.$$

The mass of oxygen to ensure full interaction with hydrogen is about 30.8 g.

Hence 37 g of $O_2$ are required for the complete reaction.

Viscosity $\mu$ of nonparaffinous oil under original reservoir conditions (formation temperature $T_O = 40°$ C.) prior to treatment $\mu = 300$ MPa.s and the oil coking temperature is from 130° to 150° C.

The device is run into the well, say, on the wire cable 15. As this takes place, the discharge chamber 5 is filled in with hydrocarbon liquid through the inlet hole 7.

Once the device is positioned in the section involved, the control panel 14 is operated to switch on the surge current generator 2 and feed voltage to the electrode 3.

There occurs a high-voltage electric breakdown in the fluid and a discharge channel is formed whereinto energy (7.5 kJ) is fed within a period of $70 \cdot 10^{-6}$s. The matter in the discharge channel is heated up to $3 \cdot 10^4$ K. and the pressure goes up to $1.2 \cdot 10^3$ MPa, such a temperature causing the liquid hydrocarbons to decompose with hydrogen and acetylene liberated. Under the effect of high pressure the discharge channel widens and gives a rapid motion to the fluid contained between the electrodes. Concurrent with the high-voltage electric break-down the oxidizer is fed at the rate of 37 g. The exothermic reactions start at this point $$2C_2H_2 + 5O_2 \rightarrow 4CO_2 + 2H_2O + 600 Kcal;$$

$$2H_2 + O_2 \rightarrow 2H_2O + 133 Kcal;$$

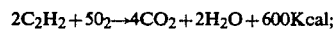
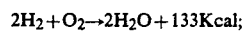

The heated fluid jet saturated with carbon dioxide penetrates into the bed at a rate of about 1800 m/s. In doing so, the rock is disintegrated and the bed is heated, thus resulting in higher oil mobility. Carbon dioxide is adsorbed on the resin surface, failing to break away, and is liberated. With gas gradually expanding, its energy does effective work for oil travel in the bed. What is more, carbon dioxide, while reacting with the mineral portion of the reservoir, dissolves certain components of the rock skeleton, thus adding to its permeability. As soon as the borehole wall temperature reaches the oil coking point (130°–150° C.), the oxidizer feed is reduced and if necessary cut off.

As a result of the operation performed, it is possible to induce higher oil inflow to the well.

EXAMPLE 2

Equipment is similar to the one used in Example 1.

Use is made of a positive electrode tubular in form (FIG. 2) composed of a plurality of tubular elements made from some erosion-resistant material and having a sharp edge. The bevel angle of the electrode edge is 10°.

The shape of the electrode makes it possible to form a break-down discharge under the conditions of high pressure by ensuring a high electric intensity in the electrode-to-electrode gap.

EXAMPLE 3

Stimulation of the well filled in with formation water or drilling fluid. Equipment and methods are similar to those in Example 1, except that a current-conducting fluid is fed into the electrode-to-electrode gap, the fluid comprising a dielectric fluid, such as, for example, hydrocarbon liquid and a current-conducting powder material, for instance, aluminium. The moment the current-conducting fluid closes the electrode-to-electrode gap, high voltage is fed to the electrodes resulting in a breakdown. The current-conducting channel is formed, whereinto energy (7.5 lJ) stored by the capacitors is introduced.

With the energy vigorously released in the discharge channel, the number of elementary particles therein increases due to the evaporating initiator molecules and their dissociation and ionization take place. This period is $40 \cdot 10^{-6}$s according to experimental data. The temperature in the discharge channel by the time the energy release is over is $1.8 \cdot 10^4$ K. and the pressure in the channel is $1.5 \cdot 10^3$ MPa. The moment the energy release is over, the oxidizer powder, viz. lead dioxide is fed. The aluminium powder and the lead dioxide powder are evaporated in plasma and dissociate into ions. At this point exothermic reaction takes place:

$$3PbO_2 + 4Al \rightarrow 2Al_2O_3 + 3Pb + 200 Kcal$$

The reaction products penetrate the well fluid, heat it and partly evaporate it. The heated fluid and vapour penetrate the fissures resulting from the preceding shock wave and pores at a high rate. Thus, as a result of the additional thermal effect, the bed is heated, thereby increasing oil mobility. Since the borehole wall temperature following the exothermic reaction in plasma may reach 800° C. and above, it is necessary to control the temperature. As soon as the borehole wall temperature reaches the oil coking point from (130° to 150° C.), the oxidizer feed is reduced and if necessary cut off. The shock waves stimulate the heated bed. In this case, the amount of heat is decreased because of lack of the oxidizer.

EXAMPLE 4

Equipment and methods are similar to those used in Example 1, except that the inlet and outlet holes in the wall of the discharge chamber are covered on the outside with an elastic diaphragm. A breakdown between the electrodes occurs in the dielectric fluid the discharge chamber is filled with, which ensures stable operation of the device in wells filled in with high-conductivity solutions. The elastic diaphragm allows an effective transfer of the shock wave and fluid flow pressure to the surrounding medium for stimulating the bed.

EXAMPLE 5

Equipment and methods are similar to those used in Example 1 except that the discharge gap is limited by gas-filled elastic envelopes. The shock wave intensity substantially increases due to volume cavitation.

Industrial Applicability

The invention can find application in restoring permeability of a hole-bottom region affected during operation by the deposition of asphalt-and resinous substances present in the well production, completing a well, breaking and removing a colmatant from the borehole walls, as well as in formation fracturing to increase permeability of the hole-bottom region.

What we claim is:

1. A method for well stimulation in the process of oil and/or gas and/or gas-condensate production, which comprises periodically generating shock waves propagating through the producing formation by initiating an electric discharge in a fluid filling in the well in a gap between electrodes positioned in the well, introducing a current-conducting fluid, comprising a dielectric fluid and a current-conducting powder material, into the gap between the electrodes and initiating the electric discharge between the electrodes.

2. A method as claimed in claim 1, wherein the dielectric fluid comprises hydrocarbon, silicone liquid or water.

3. A method as claimed in claim 1, wherein the current-conducting powder material comprises metal or graphite.

4. A method as claimed in claim 3, wherein the current-conducting fluid comprises aluminum or magnesium powder as the current conducting powder.

5. A method as claimed in claim 1 wherein the current conducting fluid introduced between the electrodes comprises an oxidizer to provide an exothermic reaction.

6. A method as claimed in claim 5, wherein when metal or graphite is used as a current-conducting powder material, the current conducting fluid further comprises an oxidizer comprising at least one material selected from the group consisting of lead dioxide, ferric oxide or potassium permanganate.

7. A method as claimed in claim 5, wherein when aluminum or magnesium is used as a current-conducting powder material, the oxidizer comprises at least one of lead dioxide, ferric oxide or potassium permanganate.

8. A method as claimed in claim 5, wherein lead dioxide, ferric oxide or potassium permanganate, is the oxidizer when metal or graphite is used as a current-conducting powder material.

9. A method as claimed in claim 5, wherein the oxidizer comprises a gaseous substrate interacting with products formed during the electric discharge.

10. A method as claimed in claim 9, wherein an oxygen-containing gas is used as the oxidizer.

11. A method as claimed in claim 5, wherein the temperature of fluid in the well is measured at regular intervals in the process of well production stimulation and the amount of the oxidizer fed is controlled to maintain the temperature of the fluid in the well below the oil coking temperature.

12. A method as claimed in claim 9, wherein the temperature of a fluid in the well is measured at regular intervals in the process of well production stimulation and the amount of the oxidizer fed is controlled to maintain the temperature of the fluid in the well below the oil coking temperature.

13. A device for, stimulating production of a well comprising at least one discharge chamber (5) with positive and negative electrodes (3,4), a system of feeding an initiator between the electrodes (3,4) and a surge current generator (2) connected to the electrodes (3, 4), at least one metering valve (12) for the initiator fluid having a drive (13) connected with the surge current generator (2) to ensure synchronous operation of the metering valve (12) with electric discharge between the electrodes (3,4), and a chamber (9) filled in with a dielectric fluid, the metering valve (12) periodically bringing the discharge chamber (5) in communication with the chamber (9) by means of a duct (10) provided in the wall of the chamber (9) and in the negative electrode (4), a pressure spool valve (11) to ensure a constant differential pressure between the chamber (9) and the well, the wall of the discharge chamber (5) being provided with inlet and outlet holes (7,6) to communicate with the borehole medium.

14. A device as claimed in claim 13, wherein the duct (10) is provided in the negative electrode (4), the positive electrode (3) being tubular in form and formed from an erosion-resistant material, the hollow interior of the positive electrode (3) being filled with a solid dielectric material.

15. A device as claimed in claim 14, wherein the positive electrode (3) is comprised of a plurality of tubular elements (21) arranged coaxially with one another so that an outer surface of one tubular element adjoins an inner surface of another tubular element and each of the outer tubular elements is displaced relative to the adjacent inner tubular element away from the negative electrode (4).

16. A device as claimed in claim 15, wherein the tubular elements (21) are displaced with respect to one another at a uniform spacing so that the taper surface encompassing edges of the tubular elements (21) makes up an acute angle of from 8° to 15° with the longitudinal axis of the positive electrode (3).

17. A device as claimed in claim 13 wherein the system for introducing an initiator into a gap between the negative electrode and the positive electrode comprises a hydraulic amplifier (23) and a pneumatic hydraulic accumulator (24) connected by means of the duct (10) with the pressure spool valve (11) and the metering valve (12) arranged in the following sequence: the hydraulic amplifier (23), the pressure spool valve (11), the pneumatic hydraulic accumulator (24), and the metering valve (12), the chamber (9) forming an upper part of the hydraulic amplifier (23) and being filled with a current-conducting initiating fluid and a lower part of the hydraulic amplifier (23) communicating with the bore hole medium.

18. A device as claimed in claim 16, for stimulating a well, wherein the system for introducing an initiator from the negative electrode to the positive electrode comprises a hydraulic amplifier (23) and a pneumatic hydraulic accumulator (2) connected by means of the duct (10) with the pressure spool valve (11) and the metering valve (12) and arranged in the following sequence: the hydraulic amplifier (23), the pressure spool valve (11), pneumatic hydraulic accumulator (24), and the metering valve (12), the chamber (9) forming an upper part of the hydraulic amplifier (23) and being filled with a current-conducting initiating fluid and a lower part of the hydraulic amplifier (23) communicating with the borehole medium.

19. A device as claimed in claim 17, wherein the inlet and outlet holes (7, 6) in the wall of the discharge chamber (5) are covered on the outside with an elastic diaphragm (29, 30).

20. A device as claimed in claim 13 wherein gas-filled elastic envelopes (31) are provided on the outside of the device at positions above and below the outlet holes in the discharge chamber to isolate the space between the borehole wall and the discharge chamber.

21. A device as claimed in claim 16, comprising gas-filled elastic envelopes (31) provided on the outside of the device at positions above and below the outlet hole (6) in the discharge chamber (5) to isolate the space between the borehole wall and the discharge chamber (5).

22. A device as claimed in claim 17, comprising gas-filled elastic envelopes (31) provided on the outside of the device positioned above and below the outlet hole (6) in the discharge chamber (5) to isolate the space between the borehole wall and the discharge chamber (5).

* * * * *